(No Model.)
W. W. GILES.
Velocipede.
2 Sheets—Sheet 1.
No. 236,572. Patented Jan. 11, 1881.
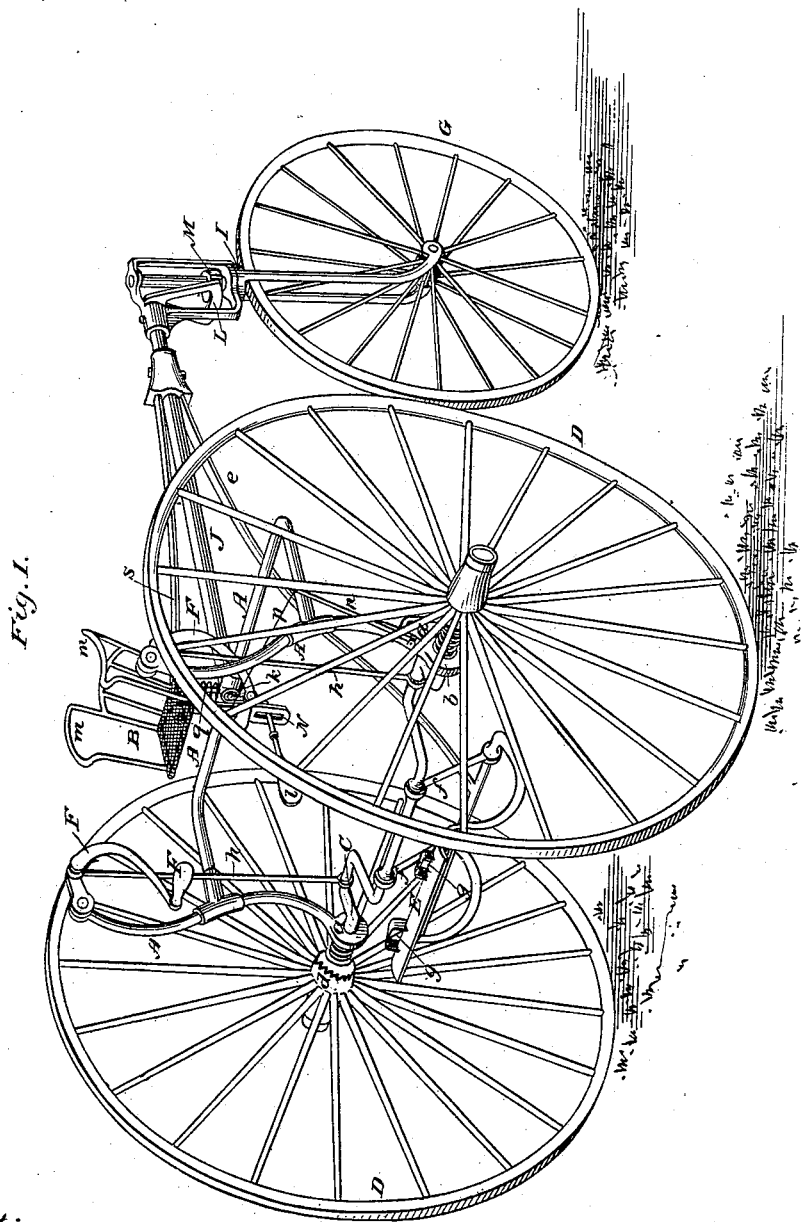
Attest:
Inventor:

(No Model.)
W. W. GILES.
Velocipede.
No. 236,572.
2 Sheets—Sheet 2.
Patented Jan. 11, 1881.
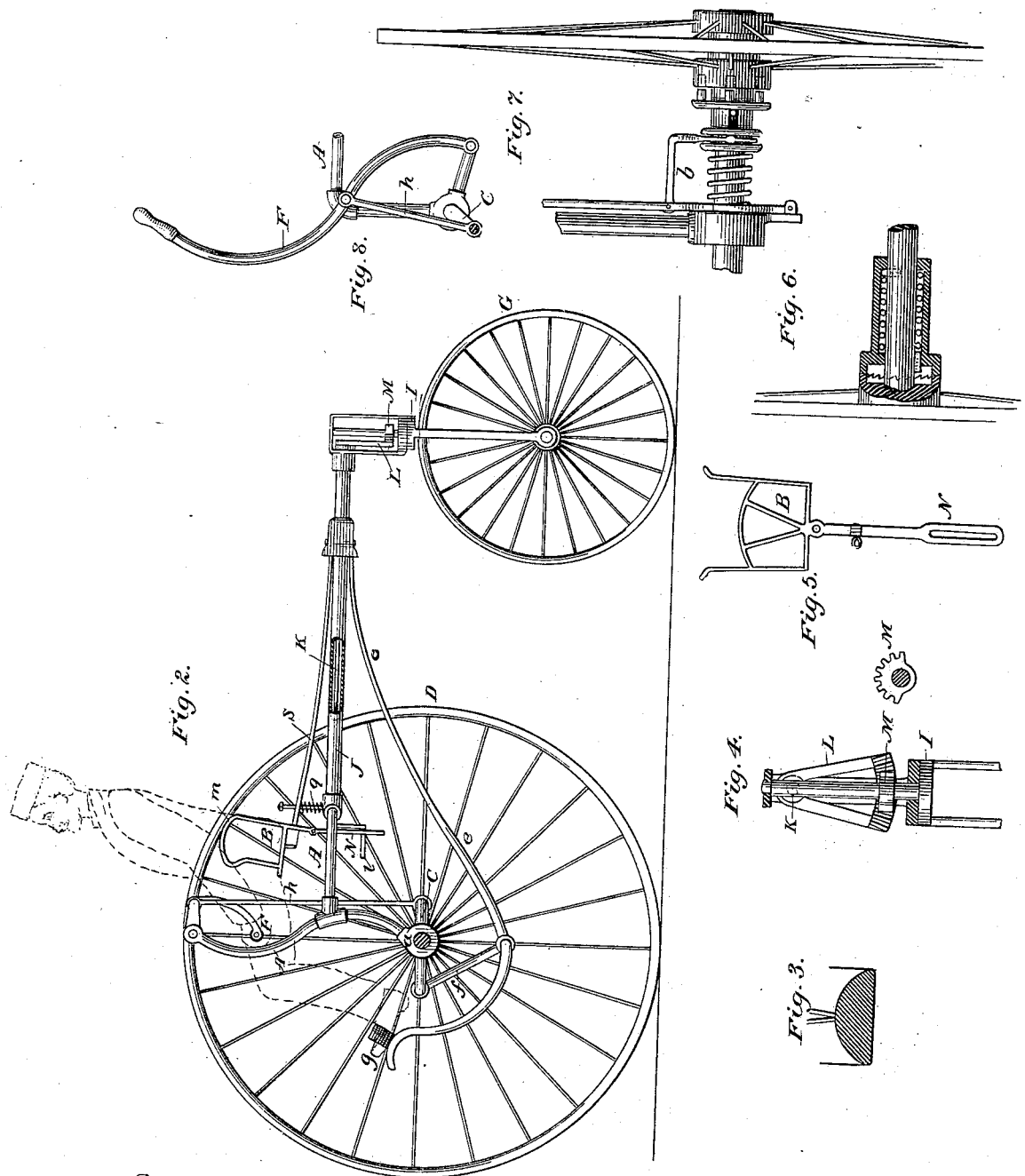

UNITED STATES PATENT OFFICE.

WILLIAM W. GILES, OF WASHINGTON, DISTRICT OF COLUMBIA.

VELOCIPEDE.

SPECIFICATION forming part of Letters Patent No. 236,572, dated January 11, 1881.

Application filed October 9, 1880. (No model.)

*To all whom it may concern:*

Be it known that I, WILLIAM WHEETEN GILES, of Washington, in the District of Columbia, have invented new and useful Improvements in Velocipedes; and I do hereby declare that the following is a full and complete description of the same.

Heretofore vehicles of this class have possessed several grave practical defects, which it is the object of my invention to correct: First, they have generally been constructed so that the propelling power will be applied to a single wheel in front. Second, when the propelling power has been applied to two wheels it has generally been to wheels at the rear, and has been confined to the power of the feet. Third, they have been exceedingly liable to capsize in turning. Fourth, where hands and feet have been used for propulsion the duty of steering has been performed by the hands or feet while also engaged in propelling the vehicle, and necessarily at a considerable temporary loss of power. Fifth, the foot-propellers were incapable of effective action except in one direction. Sixth, when two propelling or traction wheels have been employed it has been impossible to propel the vehicle backward. Seventh, the operator has always had some portion of the vehicle directly in front of him, and in case of accidental and sudden stoppage the rider has been thrown forward against said portion of the vehicle, and thereby injured. Eighth, they have required the alternate use of the feet and legs, thereby greatly increasing the labor and unpleasant effects of that species of labor.

All of these defects are cured by my invention, which relates to a velocipede having more than two wheels; and it consists, principally, in the clutch-coupling on one of the driving-wheels; in a seat capable of vibrating in a vertical plane transverse to the line of advance and steering-gear connected therewith, so that the vehicle may be steered by swaying the body toward one side or the other; in a hollow reach to house and protect the steering-shaft; in the projecting crank-arm of the steering-shaft; in the steering-shaft with pendent crank ends, the weight whereof tends to keep the steering-wheel in median position.

That others may fully understand my invention, I will more particularly describe it, having reference to the accompanying drawings, wherein—

Figure 1 is a perspective view of my vehicle. Fig. 2 is a side elevation of the same. Fig. 3 is a transverse section of felly; Figs. 4 and 5, details of steering-gear; Figs. 6 and 7, details of clutch and ratchet; Fig. 8, modification of hand-lever.

A is the frame, which, by preference, I propose to construct of gas-pipe or similar tubular metal, though it may be made from solid rods, if for any reason that shall be more desirable. I also prefer to make the frame A in the form shown in the drawings, though this is not essential to any greater degree than what is required to enable the seat B to be placed behind the vertical plane of the axle C, so that the specific gravity of the rider shall fall behind said plane and behind the points where the wheels D rest upon the ground. The axle C turns in boxes $a$ at the front of the frame A, and the wheels D D are mounted upon the ends of said axles, and provided with connections which couple or uncouple said wheels from said axle, as may be desired. Ordinarily said connection consists of a simple ratchet and pawl or some recognized substitute for the same, which, when the axle is turned forward, engages with the wheel and causes it to revolve forward also, but which permits the axle to be revolved backward freely. This arrangement does not enable the rider to propel his vehicle backward by a backward movement of the axle. I have therefore provided one of my driving-wheels with a clutch, $b$, instead of a ratchet, (one form of which is shown at $d$,) and thereby the wheel so provided is locked to the axle and forced to turn with it in either direction.

The propelling power is applied to the front axle, C, which is therefore bent to form suitable cranks, substantially as shown, said cranks being all located in the same plane, but in opposite directions from the axis, so that they alternate in action. The cranks turning or offset from the axis in one direction receive power applied by the feet and legs, and the cranks turning from the axis in the opposite direction receive power applied by the hands and arms.

The circular movement of the feet in following a crank in its revolution is unpleasant, and I have therefore provided a treadle, E, for the feet. It is sustained by an arm, e, which extends backward to some rigid support, and by links or couplings f, which connect it with the foot-crank of the axle C. The feet rest upon the treadle E and move up and down with it in a line substantially straight while said crank revolves. Heretofore, so far as the feet were concerned, their force could only be applied through a period less than one-half the complete revolution; but I have supplied the treadle E with toe straps or sockets g, whereby, if the rider choose, he can pull upward on said treadle, and thus apply propelling power during nearly the entire revolution of the crank.

Hand-power is applied to the hand-cranks of the axle C by means of the hand levers or cranks F and connecting-rods h. The hand-power thereby co-operates with the foot-power, and may be continued over the up and down strokes of the crank.

The steering-wheel G is mounted in a pivoted frame, I, and may be a caster or trailing wheel, or otherwise, as preferred. The frame I is pivoted at its upper end in a proper bearing at the rear end of the tubular reach J, which at its front end is rigidly attached to the frame A. This structure makes the frame very rigid and maintains the three points of support upon the ground in a practically-unchanged relation.

In the use of velocipedes having more than two wheels it has been found that there is great liability to upset while turning corners. This liability arises from the changed position of the steering-wheel, which is usually thrown inward on the curve, while the momentum and centrifugal force of the rider tend to throw his center of gravity outward. I have constructed my steering-gear so that the position of the steering-wheel shall not change materially, and so that the management of said wheel requires the rider to lean his body inward toward the axis of the curve, and thus counteract effectually any tendency to upset. I therefore place a shaft, K, within the reach J, and provide a crank, k, at its forward end, while at its rear end I have placed a segment-rack, L, which meshes with a pinion, M, on the pivot of the steering-wheel G. The crank k and the rack L are both shown as dependent below the shaft K, though every mechanic will understand that the coincidence of movement between the seat B and the wheel G described may be accomplished by other arrangements of these parts. The weight of the rack L and crank k tends to keep the steering-wheel always in the plane of the line of progression.

The seat B is mounted upon a horizontal pivot upon the frame A, directly in the plane of the reach J, so that it may be capable of a vibrating movement from side to side. From the bottom of said seat an arm, N, depends, and engages with the crank k by means of a slot, through which said crank projects. A movement of the seat B toward the right, therefore, rotates the shaft K and turns the wheel G toward the left, and the course of the machine curves toward the right, and vice versa.

The seat B may be mounted upon an elastic support, if desired. It may also be provided with side pieces or arms, m, which should press the rider's sides somewhat closely, so that the steering may be effected without unnecessary motion of the body.

The extremity of the crank k may be extended, as at l, so that it can be pressed by the leg of the rider to aid the swaying body in steering.

When the tricycle is running on a curved track the outer wheel will revolve faster than the inner wheel as to the curve, and the inner wheel-coupling will then slip and the propulpulsion be effected entirely by the outer wheel. It becomes necessary, therefore, that my clutch-coupling shall be automatically disengaged when the course curves in one direction, as the inner or clutched wheel would, in that event, be compelled to slip upon the ground. I therefore provide the clutch b with a shipping-lever, n, and connect said lever with the swaying seat by a wire or other coupler, p, so that the movement of said seat in one direction will actuate the clutch to disengage it, as required.

It will be observed that, as the driver sits upon the seat B with his feet upon the treadle E, no portion of the vehicle is in front of him to prevent him from leaping off or falling clear from the vehicle in case of accident.

If it is desired to give the seat an elastic support, it may be placed upon a long spring, S, and it is desirable to re-enforce the same with a spiral spring, q. By depressing the seat more or less it may be adapted to long or short legs, and this depression may be accomplished by a take-up screw or other well-known device. A seat wide enough for two may also be used.

Having now described my invention, what I claim as new is—

1. In a three or four wheeled velocipede, two driving-wheels on one axle, one of said wheels provided with a ratchet-coupling and the other of said wheels provided with a clutch, as and for the purpose set forth.

2. In a velocipede or tricycle, a seat capable of lateral vibration in a vertical plane transverse to the line of progression, combined with mechanism to connect said seat with the steering-wheel, whereby the sway of the rider's body may control the steering-wheel, as set forth.

3. The seat B, mounted upon a horizontal and longitudinal pivot, so as to be capable of lateral vibrations, and provided with a slotted arm, N, combined with a crank-shaft, K, and mechanism to connect said shaft with the steering-wheel G, whereby the swaying of said seat may control said steering-wheel, as set forth.

4. The seat B, capable of lateral vibrations, and provided with a slotted arm, N, and the crank-shaft K in engagement therewith, as set forth, combined with the rack L on said shaft and the pinion M on the frame I of the steering-wheel G, as set forth.

5. A tricycle-frame constructed with a rigid part, A, to mount the driving-axle and seat upon, combined with a tubular reach, J, rigidly secured at its front end to said frame, and provided at its rear end with a suitable bearing for the pivot of the steering-wheel, and a shaft, K, within said tubular reach, with mechanism whereby said shaft is caused to control said steering-wheel.

6. A tricycle provided with a rear steering-wheel and a seat capable of lateral vibrations, a slotted arm pendent from said seat, a crank-shaft, K, connected at its rear end with the guide-wheel and at its front end with said slotted arm N, and an extension, $l$, whereby the legs may assist the swaying body to effect the steering.

7. The clutch $b$ to lock the axle and the wheel, provided with a shipping-lever, $h$, combined with a swaying seat, B, and the intermediate coupling $p$, for the purpose set forth.

8. The seat B, capable of lateral vibration in a vertical plane transverse to the line of progression, provided with side arms, $m$, to embrace the sides of the rider, substantially as and for the purpose set forth.

9. A steering-wheel, G, at the rear of the vehicle, and a shaft, K, whereby said wheel is controlled, combined with weights pendent from said shaft in crank $k$, and segment L, or equivalents, whereby said shaft and steering-wheel are maintained in a median position, as set forth.

W. W. GILES.

Witnesses:
R. D. O. SMITH,
A. B. SMITH.